H. S. BERGEN.
WEIGHING SCALE.
APPLICATION FILED AUG. 30, 1915.
1,310,940.
Patented July 22, 1919.
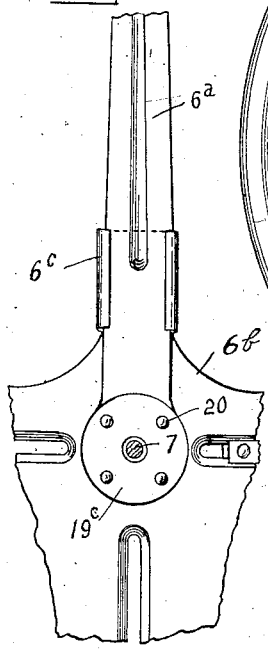
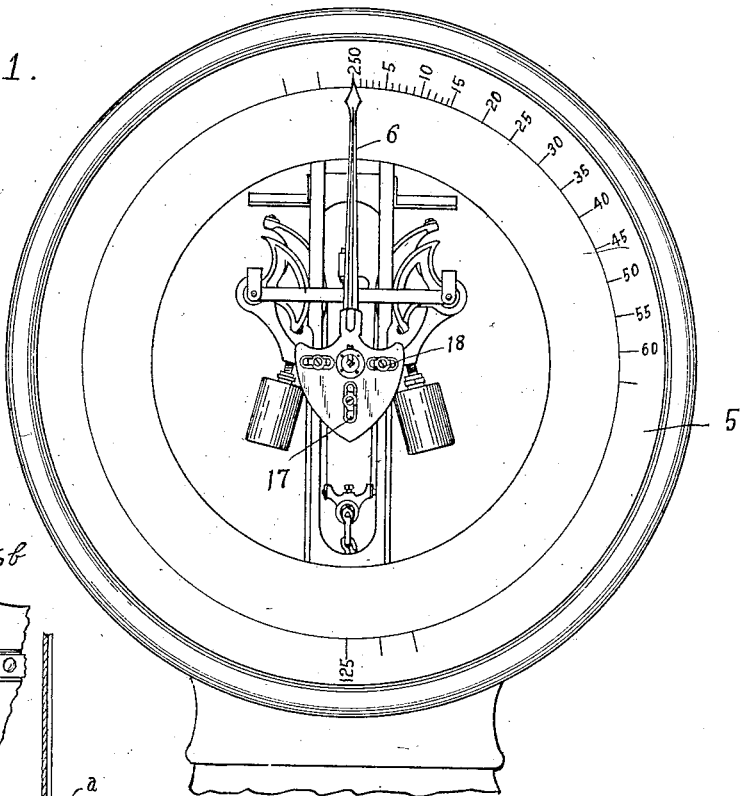
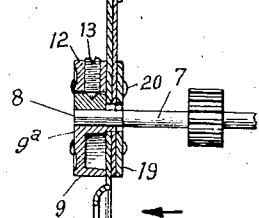
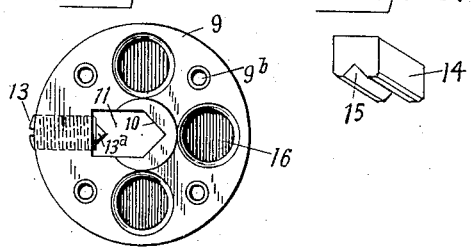
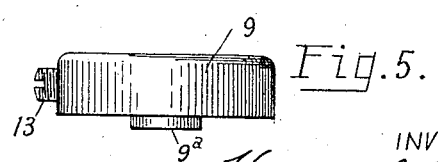

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING-SCALE.

1,310,940.  Specification of Letters Patent.  Patented July 22, 1919.

Application filed August 30, 1915. Serial No. 48,043.

*To all whom it may concern:*

Be it known that I, HARRY S. BERGEN, a citizen of the United States, residing at Toledo, in the county of Lucas and State of Ohio, have invented certain new and useful Improvements in Weighing-Scales, of which the following is a specification.

This invention relates to weighing scales, and more particularly to scales giving the weight indications by means of a graduated dial or chart in conjunction with an indicator hand or pointer angularly movable over the graduted face of the dial a distance proportional to the displacement of the weighing mechanism. One of the best known methods of imparting the desired movement to the indicator hand is to secure the hub of the indicator hand upon a rotatable shaft which also carries a pinion fixed thereon in position to mesh with a reciprocating rack actuated by the weighing mechanism of the scale, though other shaft-rotating means such as a cam and ribbon, or extension arm and link, have been substituted for the pinion and rack, and are well known in the art. However, the means for mounting the hub of the indicator hand upon the shaft and for accurately alining and maintaining the pointer in the exact position desired have not been developed in accordance with the advance in the development of the remaining mechanism of the scale, though the defects of the usual hand securing means employed are generally recognized. The difficulties of securing a perfect alinement and fit of the several parts of the hand securing mechanism are increased because of the lightness of material and the delicate balance required in the indicating hand, the smallness of the co-acting parts of the indicator hub and shaft, and the absolute accuracy demanded in weighing scale indications. It is toward the improvement of the means of mounting the indicator hand or pointer upon the indicator hand shaft that my present invention is directed.

Reference is to be had to the accompanying drawings, illustrating a preferred embodiment of my invention, and in which similar reference characters designate similar parts throughout the several views.

In the drawings:—

Figure 1 is a front view of the dial and indicating hand of a scale embodying my improved device.

Fig. 2 is a longitudinal section through the hub and adjoining portions of the indicator hand.

Fig. 3 is a detail elevation showing the rear face of one of the disks forming the securing means of the indicator hand.

Fig. 4 is a perspective view of the retaining block employed in connection with the disk shown in Fig. 3.

Fig. 5 is an edge view of the disk shown in Fig. 3, and

Fig. 6 is a rear view of a portion of the indicator hand and securing means looking in the direction of the arrow in Fig. 2.

Referring to the drawings, the numeral 5 designates the dial of a scale, upon which are marked the weight indications or graduations, and 6 designates the indicator hand or pointer which coöperates with the weight indications upon the dial 5 so as to indicate the weight of any commodity weighed upon the scale. The dial 5 is suitably supported in position within the housing of the scale, and the indicator hand 6 is mounted at the end of the indicator shaft 7, which shaft also carries a pinion adapted to mesh with a vertically-disposed rack actuated upon movement of the weighing mechanism of the scale.

It is to be understood that the weighing mechanism of the scale may be of any approved type, and that the connections for suitably driving the indicator shaft 7 therefrom may be of any desired form, various mechanisms well known in the scale art being fully capable of performing the required functions. The embodiment herein illustrated is one that has been found to successfully demonstrate the capabilities of this invention, and shows a pendulum scale of a well known type adapted to vertically reciprocate a rack upon the displacement of the pendulum mechanism, the rack meshing with a pinion carried upon the indicator shaft upon which the indicator hand is secured in accordance with my invention, but it is to be understood that other types or forms of scales could also be used. Inasmuch as the present invention is not dependent upon any particular form of scale mechanism no attempt is made in this application to show a complete scale mechanism nor to delineate the action of the scale in its load-offsetting or weighing operations; only so much of the scale mechanism being shown as is necessary to clearly portray the position and operation of the indicator hand and securing means forming the claimed invention herein disclosed.

Adjacent its end the indicator shaft 7 is squared as shown, and upon this squared portion 8 is arranged the disk 9, the hub or central portion of which is elongated as shown at 9ª in Figs. 2 and 5, the outer surface of the projection 9ª being substantially circular with a portion thereof cut away to form an elongated slot 11, the lower walls 10 of which are inclined at right angles to each other, and thereby shaped so that the two walls 10 as shown in Fig. 3 will aline with and snugly fit against two of the sides of the squared portion 8 of the shaft 7. The walls 10 above referred to are formed as the V-shaped lower end of the elongated slot 11 which extends transversely through the disk 9, and the upper wall of this slot is preferably arranged at right angles to the side walls thereof as shown. The disk 9 is provided with an internally threaded aperture 12 for the reception of an adjusting screw 13, the lower end of the aperture opening into the upper wall of the slot 11, as clearly shown in Fig. 2. The adjusting screw 13 preferably terminates in a cone-shaped end portion 13ª adapted to seat in a conical depression in the upper face of the retaining block 14. The lower face of the retaining block 14 is formed with a V or trough-shaped slot 15, the walls of which are at right angles with each other, as shown in Fig. 4, the walls of the slot 15 being adapted to seat upon and aline with two of the sides of the squared portion 8 of the indicator shaft. Suitable means may be provided upon the adjusting screw 13 for rotating the same, as for example, the key slot herein shown or a knurled head, etc. Suitable rivet holes 9ᵇ are formed in the disk 9 for the reception of rivets as hereinafter described.

It is essential to the accurate operation of a weighing scale that the indicator hand be as light as is consistent with rigidity and also that it be perfectly balanced on opposite sides of its pivotal point. To aid in maintaining the required lightness, the disk 9 is provided with a series of cut-outs or apertures, as shown at 16, and the indicator hand is formed of aluminum, thin sheet metal, or other light and rigid material. The indicator hand 6 is preferably formed in two parts, one of which, as 6ª, is elongated and carries at one end the indicating point adapted to aline with the graduations upon the dial 5, while at its opposite end it is formed with a circular hub portion apertured for the reception of the indicator shaft 7 and the hand securing means. This elongated member 6ª is preferably ribbed as shown to aid in strengthening the indicator hand and assuring its maintenance in a straight position.

The other member of the indicator hand, 6ᵇ, is formed with a ribbed portion adapted to receive the inner end of the rib on the elongated portion 6ª and is provided with ears or lugs 6ᶜ adapted to be bent around the elongated portion 6ª to hold the two members in accurate alinement. The member 6ᵇ is provided with an aperture for the reception of the indicator shaft 7 and the hand securing means, and is expanded into a plate of substantially the shape shown in Fig. 1 which is appropriately slotted, as at 17, to receive small adjustable weights 18 movable radially of the pivotal point of the indicator hand for accurately counterbalancing the hand. Rivet holes are provided through the hub portions of both members of the indicator hand and are alined when these members are in their correct positions. The disk 19 is provided with a central aperture of greater diameter than the diameter of the indicator shaft 7, and is also provided with rivet holes adapted to aline with the rivet holes 9ᵇ in the disk 9 and the rivet holes in the members of the indicator hand.

Preparatory to the positioning of the indicator hand upon the shaft 7, the several parts of the hand and the hand-securing means may be assembled, the two members 6ª and 6ᵇ of the indicator hand being alined and secured in their alined positions by the bending of the ears 6ᶜ. The elongated central portion 9ª of the disk 9 is inserted within the alined central apertures in the indicator hand, after which the disk 19 is placed on the rear of the indicator hand, the several parts being then riveted in position by means of rivets 20 passing through the rivet holes in the indicator hand and disks 9 and 19. The indicator hand and its hub-securing means may thereupon be handled as a unit in the assembling of the scale mechanism, and to secure this assembled mechanism upon the squared portion of the indicator hand the inclined walls 10 of the slot 11 formed in the disk 9 are brought into engagement with two of the walls of the squared portion of the shaft 7, the retaining block 14 is positioned within the slot 11 with the inclined walls 15 thereof in engagement with the other two walls of the squared portion of the shaft and the retaining block is then clamped in position by means of the adjusting screw 13.

With the indicator hand thus clamped upon the squared end portion 8 of the indicator shaft 7, it will be apparent that every angular or rotative movement imparted to the shaft 7 through the pinion and rack actuated by the weighing mechanism of the scale will be fully transmitted to the indicating hand. Also the inclined end walls 10 of the slot 11 and the trough-shaped slot 15 in the retaining block 14 co-act to form an automatic centering and alining means for positioning the indicator hand in its correct position upon the indicator shaft 7. The adjustments afforded by the adjusting screw 13 not only permit variance in the clamping of the retaining block 14, but also allow for the take-up due to wear or slight imperfections in the formation of the interfitting parts.

While it will be apparent that the illustrated embodiment of my invention is well calculated to adequately fulfil the objects of the invention primarily stated, it will be understood that the construction is susceptible to modification without departing from the spirit and scope of the invention as set forth in the following claims.

Having described my invention, I claim:

1. In a weighing scale, an indicator hand formed of separable parts having alined portions adapted to form a hub, means for securing the parts in alined position, adjustable means carried by one of said parts for balancing the hand on all sides of the axis of its hub, and another of said parts being slotted to receive securing means whereby the hand may be secured to the weighing mechanism.

2. In a weighing scale, an indicator hand formed of separable parts having alined portions adapted to form a hub, means for securing the parts in alined position, adjustable means carried by one of said parts for balancing the hand on all sides of the axis of its hub, and means adapted to be secured to another part of the hub for securing the hand upon the weighing mechanism of the scale, the last-mentioned hub part being formed with a radial slot to receive said securing means.

3. In a weighing scale, an indicator hand formed of separable parts having alined portions adapted to form a hub, means for securing the parts in alined position, adjustable means carried by one of said parts for balancing the hand on all sides of the axis of its hub, and means adapted to be secured to another part of the hub for securing the hand upon the weighing mechanism of the scale, said means including a radially-adjustable retaining-block and means for forcing said block toward the axis of the hub.

4. In a weighing scale and in combination with the weighing mechanism thereof, an indicator shaft adapted to be rotated upon operation of the weighing mechanism, said shaft being formed with a squared portion, an indicator hand, and means for securing the indicator hand upon the squared portion of said shaft including a disk having a slot therein provided with walls adapted to aline with two of the sides of the squared portion of the shaft, a radially-adjustable retaining-block having an elongated notch therein, the walls of which are adapted to aline with the other two sides of the squared portion of the shaft, and means carried by said disk and contacting with said block for forcing the walls of said slot and notch into firm engagement with the squared portion of the shaft.

5. In a weighing scale and in combination with the weighing mechanism thereof, an indicator shaft rotated upon operation of the weighing mechanism, an indicator hand formed of a plurality of parts, one of which is provided with a circular opening adjacent the pivotal point of the hand, another part of the hand having a circular portion adapted to fit within the opening in the first-mentioned part, the second-mentioned part being provided with a radial slot, and means for securing said hand upon the indicator shaft including a retaining block freely movable in said slot.

6. In a weighing scale and in combination with the weighing mechanism thereof, an indicator shaft rotated upon operation of the weighing mechanism, an indicator hand formed of a plurality of parts, one of which is provided with a circular opening adjacent the pivotal point of the hand, another part of the hand having a circular portion adapted to fit within the opening in the first-mentioned part, the second-mentioned part being provided with a radial slot, means for securing said hand upon the indicator shaft including a retaining block freely movable in said slot, and radial adjusting means mounted in the second-mentioned part and adapted to contact with said retaining block.

7. In a weighing scale and in combination with the weighing mechanism thereof, an indicator shaft rotated upon operation of the weighing mechanism and formed with a portion of polyhedral periphery, an indicator hand having its central portion provided with a slot, certain walls of which snugly fit against and aline with certain faces of the polyhedral portion of the shaft, a retaining block freely movable in said slot and having a contact portion shaped to fit against and aline with the remaining faces of the shaft, and means adjustably mounted in the hand to force and hold the retaining block in contact with the shaft.

HARRY S. BERGEN.

Witnesses:
CARL J. ZINKE,
WM. G. NEUMAN.